Patented Jan. 11, 1927.

1,614,232

UNITED STATES PATENT OFFICE.

CLINTON C. DAVIS, OF POMONA, CALIFORNIA.

AUTOMOBILE TOP DRESSING.

No Drawing.   Application filed July 1, 1925.   Serial No. 40,955.

My invention relates to an automobile top dressing, and has for its object to provide a composition which is easily applied to automobile tops and the like, and leaves a waterproof, hard and dull finish.

My invention consists of the composition of matter hereinafter described and claimed.

The following ingredients are mixed in the proportions stated: carbon black, 6 pounds; turpentine, 2 gallons; boiled linseed oil, 2 quarts; beeswax, 5 pounds.

The beeswax is preferably cut with any suitable solvent therefor, so as to make a paste more easily mixed with the other ingredients.

The ingredients mentioned are mixed together and stirred until a thoroughly homogeneous mass is obtained. Heating will facilitate the mixing.

The resulting product is a black paste, fairly stiff.

In the application of the composition the automobile top is first cleaned, and the paste is put on with a cloth, such as cheesecloth, and finished off with a dry cloth, leaving a dull finish, which is water and finger proof.

In place of the carbon black any other suitable black may be used, and any other volatile thinner, such as light hydrocarbons of the paraffin series may be substituted for the turpentine. Any other drying oil, to which preferably is added a small quantity of drier, may be used in place of the linseed oil, and carnauba wax or other waxy material may be substituted for beeswax, altho beeswax is preferable on account of its hardness and filling qualities.

It will be understood that the proportions may be varied and still result in a composition useful for the purpose described, although best results will be obtained by adhering to the proportions stated rather closely.

The composition may be used for dressing all kinds of black leather or leather substitutes.

I claim:

1. A dressing in the form of a stiff paste for automobile tops and the like consisting of the following ingredients in the proportions stated: carbon black, 6 pounds; turpentine, 2 gallons; boiled linseed oil, 2 quarts; beeswax, 5 pounds.

2. A dressing in the form of a stiff paste for automobile tops and the like consisting of the following ingredients in the proportions stated: carbon black, 6 pounds; turpentine, 2 gallons; boiled linseed oil, 2 quarts; a waxy material, 5 pounds.

In testimony whereof I have signed my name to this specification.

CLINTON C. DAVIS.